(12) United States Patent
Nishiguchi et al.

(10) Patent No.: US 9,829,653 B1
(45) Date of Patent: Nov. 28, 2017

(54) OPTICAL CONNECTOR AND ADAPTER SYSTEM FOR A DUAL-FERRULE CONNECTOR

(71) Applicant: Senko Advanced Components, Inc., Marlborough, MA (US)

(72) Inventors: Yuki Nishiguchi, Marlborough, MA (US); Jeffrey Gniadek, Northbridge, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/262,731

(22) Filed: Sep. 12, 2016

(51) Int. Cl.
    *G02B 6/36* (2006.01)
    *G02B 6/38* (2006.01)

(52) U.S. Cl.
    CPC ......... *G02B 6/3885* (2013.01); *G02B 6/3821* (2013.01); *G02B 6/3851* (2013.01); *G02B 6/3893* (2013.01)

(58) Field of Classification Search
    CPC .................................................. G02B 6/3862
    See application file for complete search history.

(56) References Cited

U.S. PATENT DOCUMENTS

| | | | | |
|---|---|---|---|---|
| 4,762,388 A * | 8/1988 | Tanaka | .................. | G02B 6/3831 385/58 |
| 5,519,799 A * | 5/1996 | Murakami | ........... | G02B 6/3825 385/66 |
| 5,602,951 A | 2/1997 | Shiota et al. | | |
| 5,692,080 A * | 11/1997 | Lu | .......................... | G02B 6/3893 385/55 |
| 5,828,804 A * | 10/1998 | Akins | .................. | G02B 6/3873 385/58 |
| 5,845,036 A | 12/1998 | De Marchi | | |
| 5,971,625 A * | 10/1999 | Lu | .......................... | G02B 6/3893 385/55 |
| 6,422,759 B1 | 7/2002 | Kevern | | |
| 6,435,732 B1 * | 8/2002 | Asao | ..................... | G02B 6/3878 385/78 |
| 6,623,175 B2 * | 9/2003 | Suematsu | ............ | G02B 6/3835 385/78 |
| 6,752,538 B1 * | 6/2004 | Bates, III | ............. | G02B 6/3893 385/136 |
| 6,821,024 B2 * | 11/2004 | Bates, III | ............. | G02B 6/3893 385/76 |

(Continued)

OTHER PUBLICATIONS

Kevern, J., "Mini-MT Connector Interface," http://grouper.ieee.org/groups/802/3/z/public/presentations/mar1997/JKMiniMT.pdf, Mar. 1997, Irvine, California, USA.
Shimoji et al., "Development of Mini-MPO Connector," Furukawa Review, No. 18, 1999, Tokyo, Japan.

(Continued)

*Primary Examiner* — Rhonda Peace
(74) *Attorney, Agent, or Firm* — Pepper Hamilton LLP

(57) ABSTRACT

Devices and methods for connecting optical fibers are provided. In some embodiments, connectors and adaptors containing mechanical-transfer type of ferrule are disclosed. In some embodiments, the mechanical-transfer type of ferrule is a mechanical-transfer dual-ferrule. In some embodiments, the connector is a mechanical-transfer dual-ferrule connector and the adaptor is a mechanical-transfer dual-ferrule adaptor. In some embodiments, an optical fiber cable that couples with at an optical fiber connector, adaptor, and other optical fiber cable using a remote release is disclosed.

18 Claims, 13 Drawing Sheets

(56) References Cited

U.S. PATENT DOCUMENTS

| | | | | |
|---|---|---|---|---|
| 6,964,526 B2* | 11/2005 | Mine | ............... | G02B 6/3847 |
| | | | | 385/77 |
| 7,150,567 B1* | 12/2006 | Luther | ............. | G02B 6/3863 |
| | | | | 385/60 |
| 7,416,348 B2* | 8/2008 | Takeda | ............. | G02B 6/3878 |
| | | | | 385/60 |
| 8,061,906 B2* | 11/2011 | Nehler | ............. | G02B 6/3869 |
| | | | | 385/53 |
| 8,221,007 B2 | 7/2012 | Peterhans et al. | | |
| 8,231,400 B2* | 7/2012 | Phillips | ............. | G02B 6/4201 |
| | | | | 439/357 |
| 8,465,311 B2* | 6/2013 | Takamatsu | ......... | G02B 6/3821 |
| | | | | 439/247 |
| 9,599,778 B2* | 3/2017 | Wong | ............... | G02B 6/3817 |
| 2011/0299814 A1* | 12/2011 | Nakagawa | ......... | G02B 6/3879 |
| | | | | 385/78 |
| 2012/0155810 A1* | 6/2012 | Nakagawa | ......... | G02B 6/3879 |
| | | | | 385/78 |
| 2014/0341512 A1* | 11/2014 | Hikosaka | ........... | G02B 6/3857 |
| | | | | 385/81 |
| 2015/0212282 A1* | 7/2015 | Lin | ................. | G02B 6/3893 |
| | | | | 385/76 |

OTHER PUBLICATIONS

Iwase et al., "Optical Components for High-Density Optical Inter-Connect System: OptoUnity," Furukawa Review, No. 32, 2007, Tokyo, Japan.

Nishimura, et al., "High-Density Multi-Fiber Connectors for Optical Interconnection," Furukawa Review, No. 34, 2008, Tokyo, Japan.

* cited by examiner

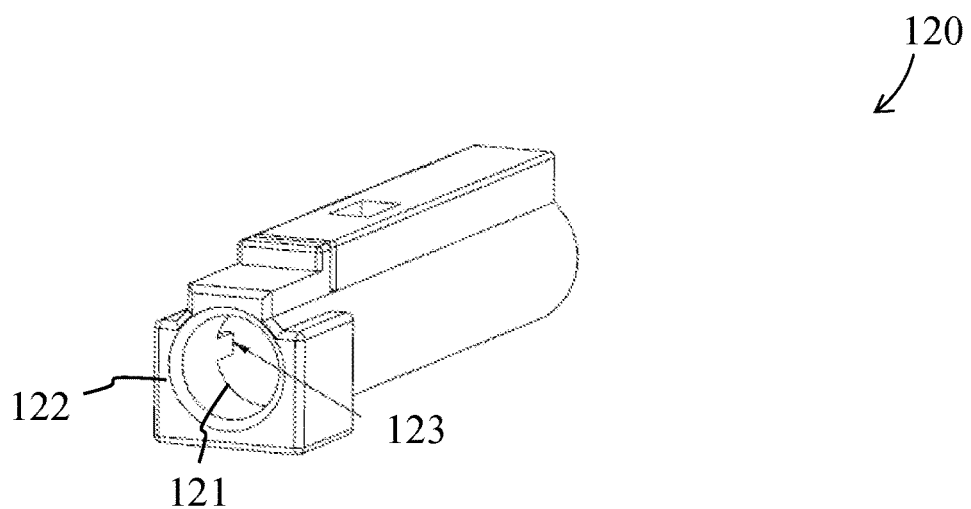
FIG. 2A
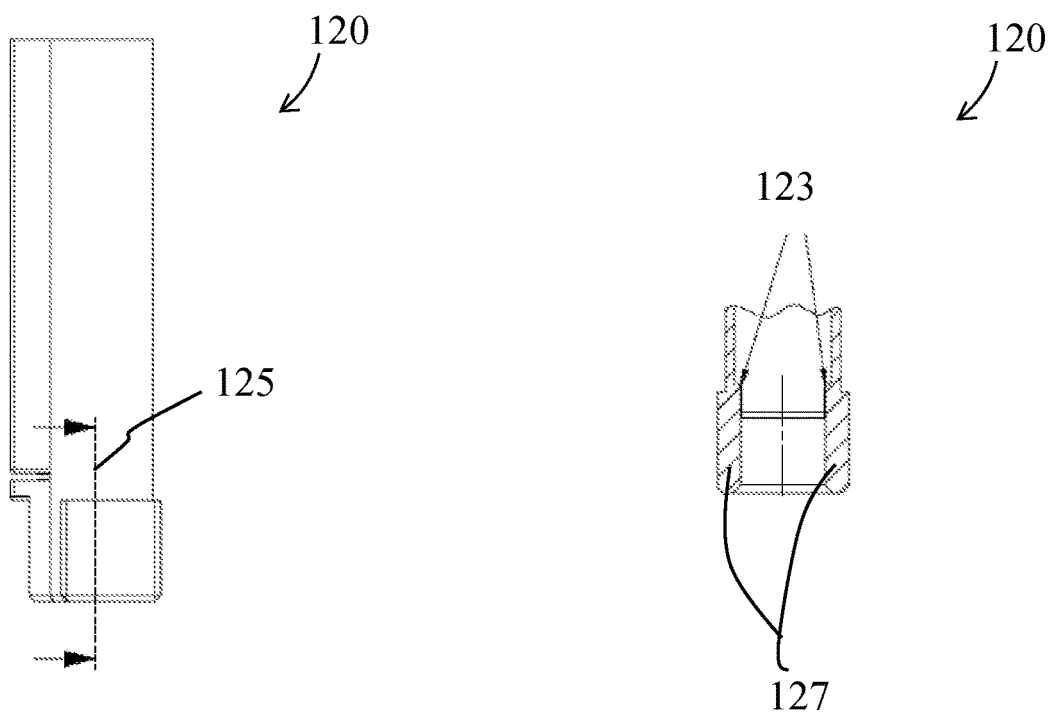
FIG. 2B
FIG. 2C

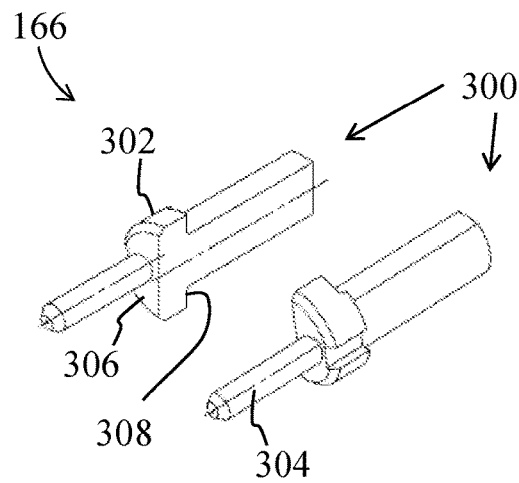
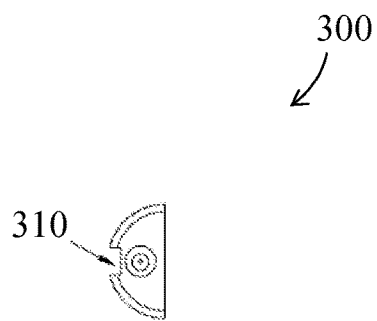
FIG. 3A
FIG. 3B
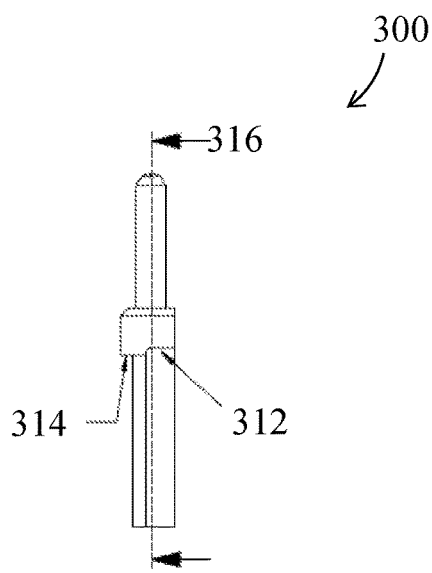
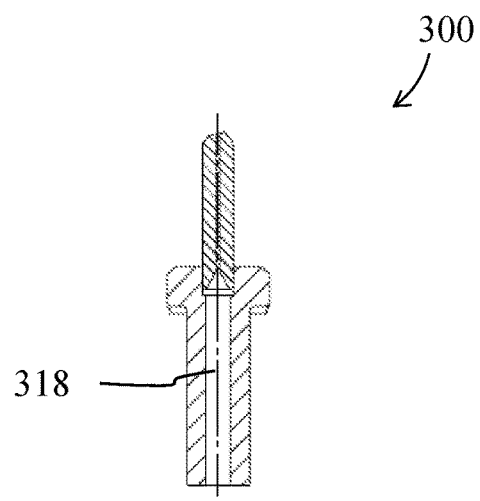
FIG. 3C
FIG. 3D

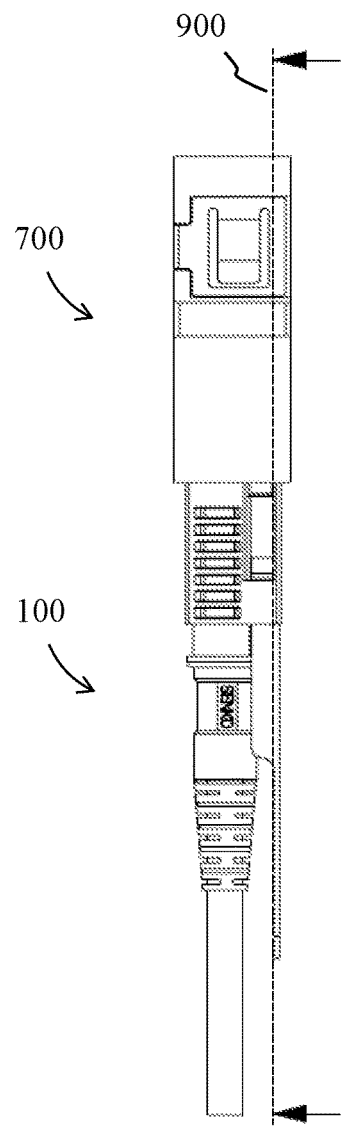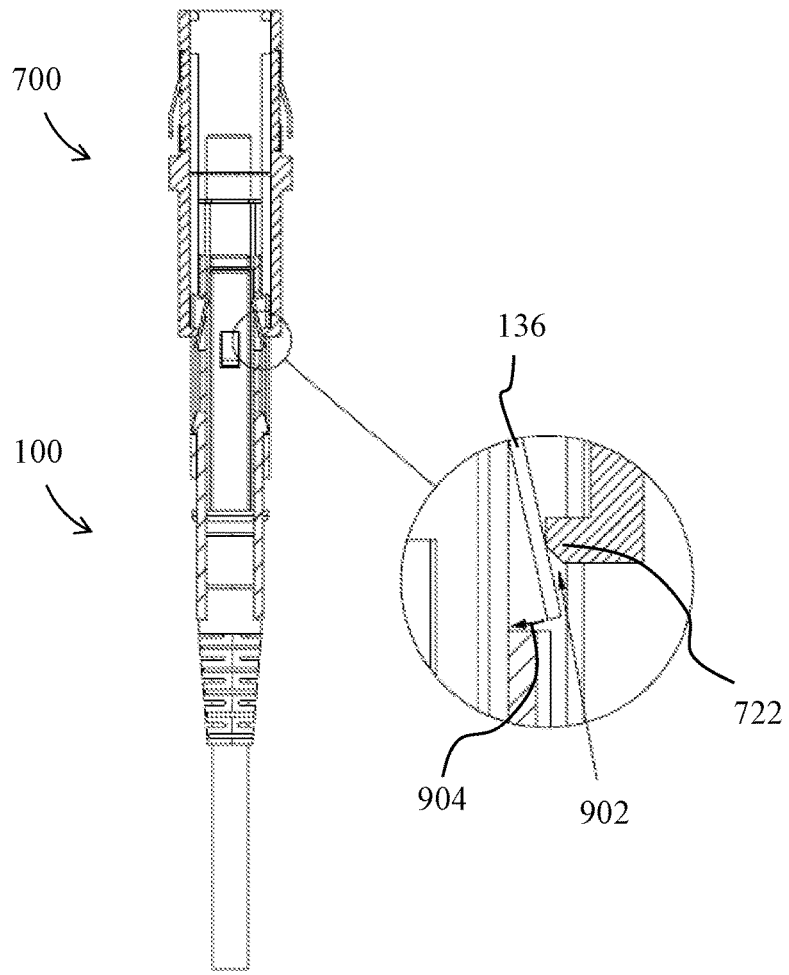
FIG. 9A  FIG. 9B  FIG. 9C

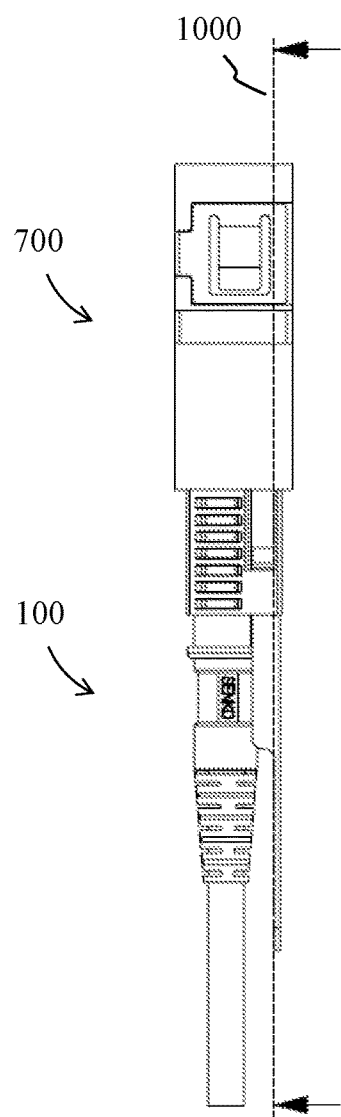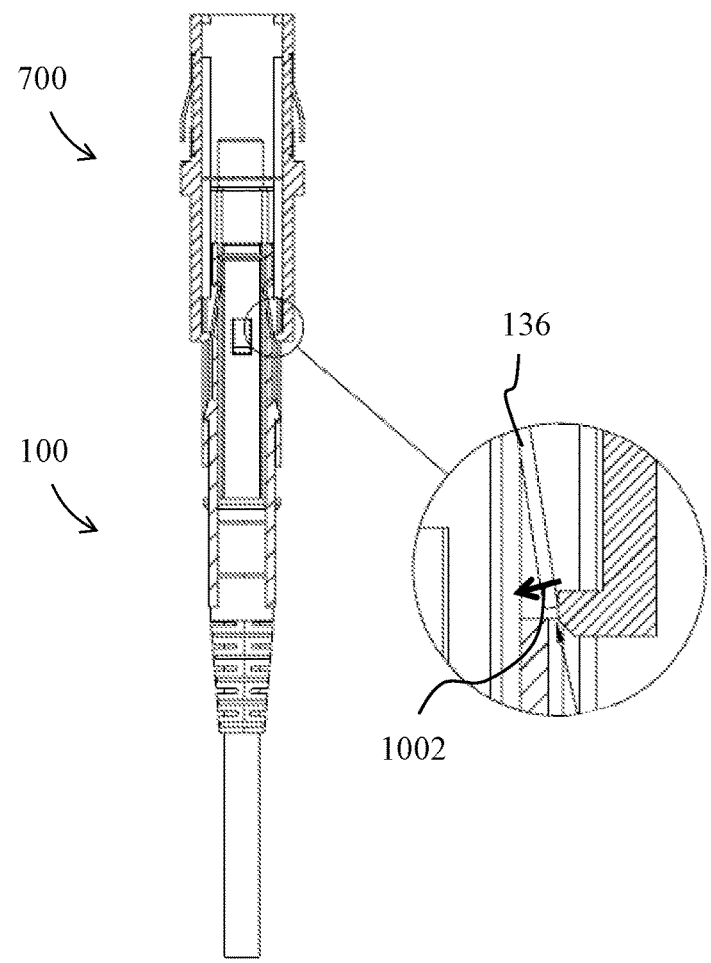
FIG. 10A    FIG. 10B    FIG. 10C

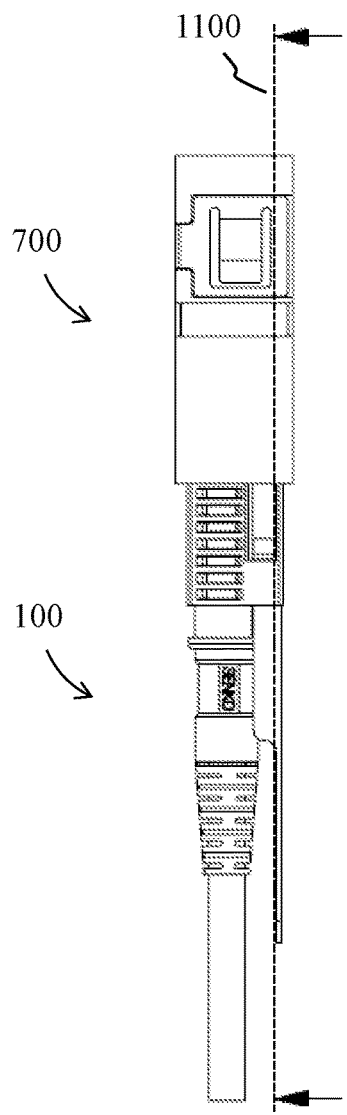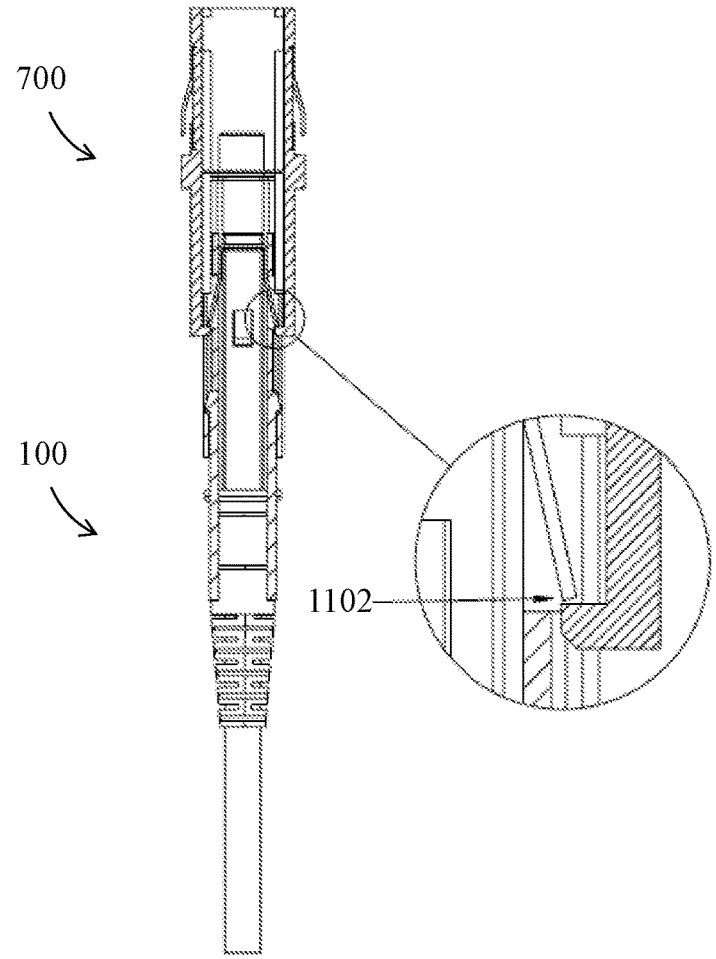
FIG. 11A            FIG. 11B            FIG. 11C

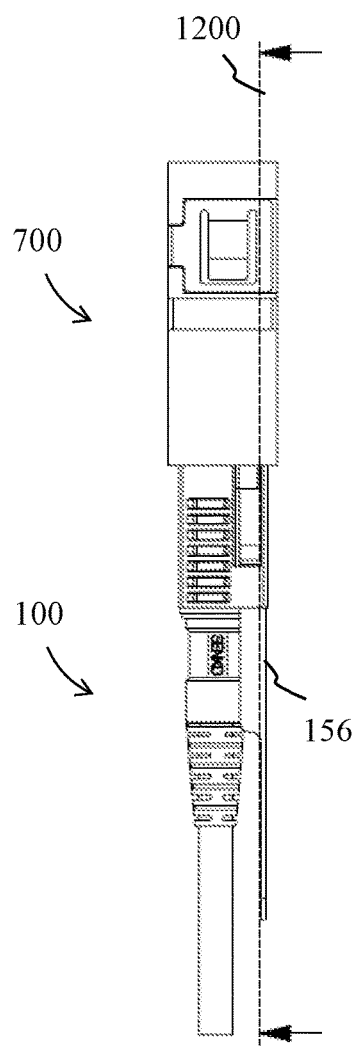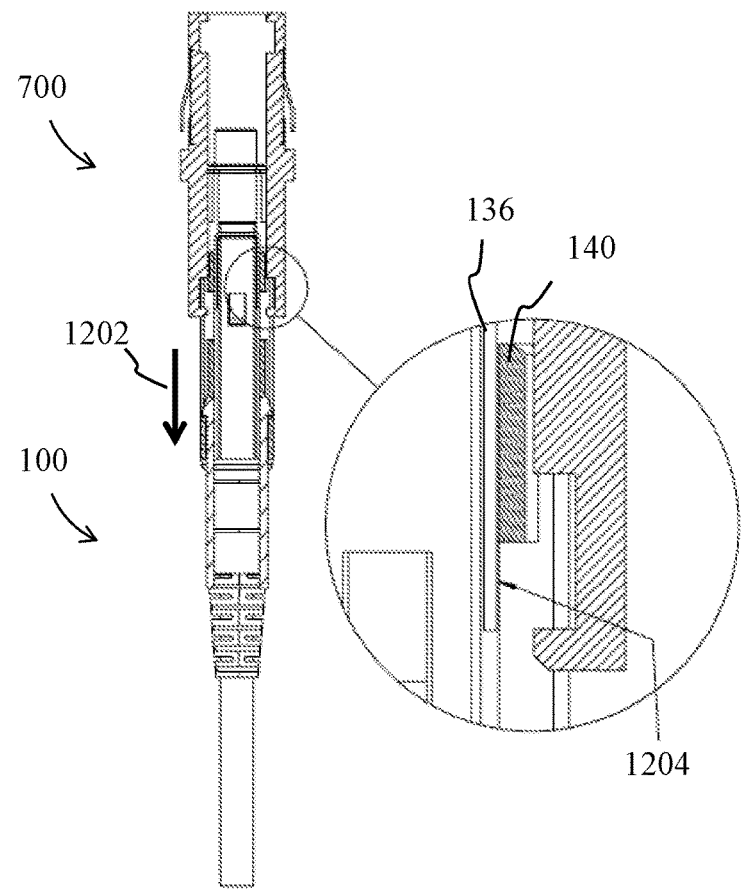
FIG. 12A  FIG. 12B  FIG. 12C

OPTICAL CONNECTOR AND ADAPTER SYSTEM FOR A DUAL-FERRULE CONNECTOR

FIELD

The present teaching relates generally to connectors and adaptors for two-fiber dual ferrule connectors, and more specifically to two-fiber dual ferrule connectors comprising embedded flexing mechanisms to couple with adaptors.

BACKGROUND

The prevalence of the Internet has led to unprecedented growth in communication networks. Consumer demand for service and increased competition has caused network providers to continuously find ways to improve quality of service while reducing cost.

Certain solutions have included the deployment of high-density network panels. These panels are designed to consolidate the increasing volume of interconnections necessary to support the fast-growing networks into a compacted space, thereby increasing quality of service and decreasing costs such as floor space and support overhead. High-density network panels may contain a large number of ports to accommodate the large number of connections often necessary to connect the network panels with the network switches or other network end terminals. The panels' ports are generally designed to mate with connectors that contain two fibers (herein referred to as a 2-fiber connector) where one fiber transmits data (Tx) and the other fiber receives data (Rx). It is common to have a number of 2-fiber connectors, such as six 2-fiber connectors, from the network panel combined together into a fan-out jumper. In this design, the 2-fiber connectors and their fibers couple through a fan-out block and into a single cable, such as a 12-fiber cable. A multi-fiber push-on (MPO) connector, such as a 12-fiber MPO connector, is usually mounted at the end of the single cable to connect to a transceiver located at the network switch or other network end terminal. The transceiver can then manage a large number of fibers and 2-fiber connectors using the fan-out jumper and connect to a large number of ports from the network panels.

Fan-out jumpers with 2-fiber Tx-Rx connectors may require individual ports for each Tx-Rx network connection; however, due to their design, they may create fiber management and maintenance issues for the operator that are challenging and undesirable. For instance, in a fan-out jumper with one 12-fiber MPO connector and six 2-fiber connectors, the MPO connector activates all 12 fibers as soon as it is plugged into the transceiver. However, this is convenient if there are six Tx-Rx ports that need service simultaneously on the network panel. This can cause some or all of the six Tx-Rx ports to become interrupted due to a malfunction with the MPO connector at the transceiver. Moreover, repairing the MPO connector will interrupt all 6 Tx-Rx ports as soon as the MPO connector is unplugged for troubleshooting, which may lead to an unnecessary interruption of services. Furthermore, if the network switch has 12-fiber MPO type transceivers and only one network panel Tx-Rx port coupled to a 2-fiber jumper connector needs service, this results in five additional 2-fiber connectors that are "active" but not utilized from the cable jumper. The unused but active 2-fiber connectors then need to be stored along with some lengths of 2-fiber cables until a future need is realized, adding to the fiber management problems. Additionally, 2-fiber connectors from one 12-fiber MPO fan-out jumper may not be able to reach Tx-Rx ports on the network panel needing service, in which case another transceiver would need to be powered up and another 12-fiber MPO fan-out jumper would need to be added to the equipment racks. If the length of the 12-fiber MPO fan-out jumper was determined based on the Tx-Rx port farthest from the transceiver, then there would be excessively long 2-fiber connector cables to manage when nearby Tx-Rx ports are serviced, again adding to the problem of fiber management. It is most desired to manage or "dress" the cables in horizontal and vertical cable troughs and not crossover the equipment in diagonal "short-cuts", as this causes equipment access and cable identification problems.

Certain available ferrules and connectors may be designed to couple with fan-out jumper and high-density network panels but their dimensions are not optimized for 2-fiber applications. For instance, MPO connectors are commonly configured for 2 to 36 fiber ribbon cables and are therefore much bigger than what is needed for two fiber applications with the same fiber-to-fiber center distance of about 0.25 mm. MPO connectors are about 7.6 mm high, 12.4 mm wide, 25.7 mm long (without including the strain relief boot), and MPO ferrules have a frontal contact surface of about 2.5 mm high and 6.4 mm wide. In contrast, MT-RJ connectors are configured for cable with a smaller number of fiber ribbons, such as 1 to 4 fibers, but they are larger than what is needed for two-fiber applications. MT-RJ connectors are about 10 mm high, 9.2 mm wide, 20 mm long (without including the strain relief boot), and MT-RJ ferrules have a frontal contact surface of about 2.5 mm high and 4.4 mm wide. Also, LC and SC duplex connectors may be designed for 2-fiber applications but their overall dimensions are not optimized to address the high-density requirement of high-density network panels. LC duplex connectors are about 12.7 mm high, 12.8 mm wide, 27.3 mm long (without including the strain relief boot), and SC duplex connectors are about 9.3 mm high, 24.2 mm wide, 25.2 mm long (without including the strain relief boot).

The width of connectors designed to couple with fan-out jumper and high-density network panel is too wide to fit two connectors into a single transceiver, limiting the transceiver connectivity. Transceivers have an average width of about 15 mm and the total width of two of the above-mentioned connectors is larger than 15 mm. There is, therefore, not enough space to have two connectors per transceiver and the separating wall necessary to separate them.

For 2-fiber jumper connectors coupled to fan-out jumpers and high-density network panels, adjacent connectors and cable assemblies may obstruct access to the individual release mechanisms at the Tx-Rx network panel port. Such physical obstructions may impede the ability of an operator to minimize the stresses applied to the cables and the connectors. For example, these stresses may be applied when the user reaches into a dense group of jumper connectors and pushes aside surrounding cables to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into the dense group of 2-fiber jumper connectors and activate the release mechanism, the adjacent cables and connectors may obstruct the operator's line of sight, making it difficult to guide the tool to the release mechanism without pushing aside the surrounding cables. Moreover, even when the operator has a clear line of sight, guiding the tool to the release mechanism may be a time-consuming process. Thus, using a tool may not be effective at reducing support time and increasing the quality of service.

The latching mechanism of connectors and adaptors designed for fan-out jumpers and high-density network panels is not optimized. For instance, in order to actuate, the latching mechanism often requires many parts (e.g., latching body, latching arm, latching spring, latching hole, latching flange) that are coupled to the connector and adaptor and that are often made of plastic. This increases the complexity and cost of fabrication of the connectors and adaptors due to the many parts that need to be assembled, increases the complexity of the latching mechanism due to the many parts that need to couple to actuate, limits the minimum thickness of the different parts and consequently the minimum size of the connectors and adaptors due to the weak strength of plastic, and limits the life of the connectors and adaptors due to the low resistance of plastic and the friction between the different parts that can quickly damage the connections. In addition, the latching mechanism often requires from the operator many steps to operator. This increases the complexity to operate the latching mechanism, the time the operator needs to couple the connector with the adaptor, and the chance that the operator makes a mistake and damage the connector and adaptor.

Accordingly, there remains a critical need for a better-designed fan-out jumper that meets the requirements of high-density network panels.

SUMMARY

In one aspect, a connector is disclosed for two-fiber dual-ferrule. The connector may comprise, for example and without limitation, a housing, a latch body, a latch spring, at least one ferrule, a ferrule extension spring, a pull tab, a back-post and spring retainer, an optical-cable crimp ring, and a relief boot. The connector can be, for example and without limitation, a mechanical-transfer dual-ferrule connector.

In some embodiments, the mechanical-transfer dual-ferrule contains a dual-ferrule comprising two ferrules. The dual-ferrule can be a male dual-ferrule or a female dual-ferrule. The dual-ferrule has a frontal surface contact diameter in a range of about 1.0 mm to about 3.0 mm, such as a diameter of about 2.0 mm or a diameter of about 1.2 mm.

In some embodiments, the connector is a mechanical-transfer dual-ferrule connector comprising a housing defining a longitudinal passage therethrough. The mechanical-transfer dual-ferrule connector comprises a latch body defining a longitudinal passage therethrough and being movably coupled to the housing. The mechanical-transfer dual-ferrule connector comprises a metallic latch spring disposed at least partially within the latch body and being coupled with the housing and the latch body. The mechanical-transfer dual-ferrule connector comprises a ferrule extending longitudinally from a first end to a second end, the ferrules disposed at least partially within the longitudinal passage of the housing with the first end protruding external to the longitudinal passage of the housing. The mechanical-transfer dual-ferrule connector comprises a ferrule extension spring disposed in the longitudinal passage of the housing and coupled the ferrule.

In some embodiments, the connector is a mechanical-transfer dual-ferrule connector having a height in a range of about 6.5 mm to about 12.5 mm, such as a height of about 10.5 mm or a height of about 8.5 mm. The mechanical-transfer dual-ferrule connector has a width in a range of about 5.0 mm to about 11.0 mm, such as a width of about 9.0 mm or a width of about 7.0 mm. The mechanical-transfer dual-ferrule connector has a length in a range of about 19.2 mm to about 25.2 mm, such as a length of about 23.2 mm or a length of about 21.2 mm.

In some embodiments, the connector is a mechanical-transfer dual-ferrule connector comprising a housing having a positioning edge and an alignment key. The positioning edge is designed to position the dual-ferrule within the longitudinal passage of the housing and the alignment key is designed to align the dual-ferrule within the longitudinal passage of the housing. The positioning edge, the alignment key or both are integral part of the housing, within the longitudinal passage of the housing, and at the proximal end of the housing.

In some embodiments, the connector is a mechanical-transfer dual-ferrule connector comprising a dual-ferrule composed of two ferrules. The ferrule includes a flange and an alignment pin, wherein a proximal end of the flange is designed to couple with the positioning edge of the housing and a distal end of the flange is designed to couple with a proximal end of the ferrule extension spring. The ferrule includes an alignment notch, a surface, and a spring angle recess, wherein the alignment notch is designed to align the ferrule flange with the alignment key of the housing and the spring angle recess and the surface are designed to couple with the ferrule extension spring. More specifically, the ferrule extension spring is designed to push against the surface to help positioning the ferrule within the housing. The ferrule includes a middle section designed to host an optical fiber.

In some embodiments, the connector is a mechanical-transfer dual-ferrule connector comprising a ferrule extension spring. The dual-ferrule is at least partially within a longitudinal passage of the ferrule extension spring and a distal end of the flange is in contact with a proximal end of the ferrule extension spring. The alignment pins of the ferrules from the dual-ferrule can be evenly aligned or unevenly aligned. The mismatch in the alignment of the alignment pins is due at least to a spring angle recess from the dual-ferrule. Those familiar with the art would appreciate that an extension force can be supplied to both flanges even though there is a spring angle recess.

In some embodiments, the connector is a mechanical-transfer dual-ferrule connector comprising a dual-ferrule, an housing, and a ferrule extension spring that are uniquely designed to couple together. The dual-ferrule is at least partially within a longitudinal passage of the housing and the proximal end of the dual-ferrule is protruding externally to the passage of the housing. The dual-ferrule is at least partially within the ferrule extension spring, partially within the longitudinal passage of the housing and aligned by the alignment keys.

In some embodiments, the connector is a mechanical-transfer dual-ferrule connector containing a pull tab. The pull tab comprises two latch arms, wherein the arm protrudes forward from a proximal end of the pull tab and comprises a latch hook. The pull tab is uniquely shaped so as to engage with the unique profile of the housing and the latch body. At least part of the latch arms of the pull tab is within the longitudinal passage of the latch body. The latch hook of the latch arm is designed to couple with a second latch hole of the latch body so the pull-tab can couple to the latch body. More precisely, the latch arm hook can be designed to snap with the second latch hole of the latch body, and the pull tab can be coupled to latch body by means other than by snapping into position, such as sliding or hooking into position. The pull-tab can be removably coupled to the latch body or an integral component of the latch body.

In some embodiments, the connector is a mechanical-transfer dual-ferrule connector designed to couple with an adaptor. The adaptor can be, for example and without limitation, a mechanical-transfer dual-ferrule adaptor. The adaptor may comprise, for example and without limitation, a housing, an alignment and latching key, a mounting handle, and a mounting flange.

In some embodiments, the connector is a mechanical-transfer dual-ferrule connector having a length in a range of about 27 mm to about 33 mm, such as a length of about 31 mm or a length of about 29 mm. The mechanical-transfer dual-ferrule connector has a height in a range of about 9.0 mm to about 13.0 mm, such as a height of about 11.0 mm or a height of about 10.5 mm. The mechanical-transfer dual-ferrule connector has a width in a range of about 8 mm to about 13 mm, such as a width of about 11 mm or a width of about 9 mm.

In some embodiments, the connector is a mechanical-transfer dual-ferrule connector comprising a mounting handle. The mechanical-transfer dual ferrule connector has a width in a range of about 10 mm to about 15 mm, such as a width of about 13 mm or a width of about 11 mm.

In some embodiments, the mechanical-transfer dual-ferrule connector is designed to couple with the mechanical-transfer dual-ferrule adaptor, wherein the connector can latch to the adaptor using a number of mechanisms. In the prefer embodiments, the alignment and latching key of the adaptor is used to align and insert the connector within the longitudinal passage of the adaptor housing. When inserting the connector into the adaptor, the latch body is pushed inward, using or not the pull tab. The latch spring arm of the connector makes contact with the alignment and latching key of the adaptor and bends inward as the connector is inserted. The latch spring arm springs outward when the connector is fully inserted into the adaptor, which securely latch the connector. When removing the connector from the adaptor, the latch body is pushed rearward, using or not the pull tab. The latch body pushes the latch spring arms inward and unlatches the connector from the adaptor. Continued pulling back of the latch body then removes the connector from the adaptor.

BRIEF DESCRIPTION OF THE DRAWINGS

FIG. 2A is a perspective view of one embodiment of a housing according to aspects of the present disclosure;

FIG. 2B is a side view of the housing shown in FIG. 2A;

FIG. 2C is a cross-sectional top view of the housing shown in FIG. 2A;

FIG. 3A is an exploded view of one embodiment of a mechanical-transfer dual-ferrule according to aspects of the present disclosure;

FIG. 3B is a front view of one embodiment of a ferrule from a mechanical-transfer dual-ferrule according to aspects of the present disclosure;

FIG. 3C is a top view of one embodiment of a ferrule from a mechanical-transfer dual-ferrule according to aspects of the present disclosure;

FIG. 3D is a cross-sectional side view of one embodiment of a flange from a mechanical-transfer dual-ferrule according to aspects of the present disclosure;

FIG. 9A is a side view of one embodiment of a mechanical-transfer dual-ferrule connector inserting into a mechanical-transfer dual-ferrule adaptor according to aspects of the present disclosure;

FIG. 9B is a cross-sectional top view of the mechanical-transfer dual-ferrule connector inserting into the mechanical-transfer dual-ferrule adaptor shown in FIG. 9A;

FIG. 9C is an enlarged view of the mechanical-transfer dual-ferrule connector inserting into the mechanical-transfer dual-ferrule adaptor shown in FIG. 9B;

FIG. 10A is a side view of one embodiment of a mechanical-transfer dual-ferrule connector pushed into a mechanical-transfer dual-ferrule adaptor according to aspects of the present disclosure;

FIG. 10B is a cross-sectional top view of the mechanical-transfer dual-ferrule connector pushed into the mechanical-transfer dual-ferrule adaptor shown in FIG. 10A;

FIG. 10C is an enlarged view of the mechanical-transfer dual-ferrule connector pushed into the mechanical-transfer dual-ferrule adaptor shown in FIG. 10B;

FIG. 11A is a side view of one embodiment of a mechanical-transfer dual-ferrule connector latched into a mechanical-transfer dual-ferrule adaptor according to aspects of the present disclosure;

FIG. 11B is a cross-sectional top view of the mechanical-transfer dual-ferrule connector latched into the mechanical-transfer dual-ferrule adaptor shown in FIG. 11A;

FIG. 11C is an enlarged view of the mechanical-transfer dual-ferrule connector latched into the mechanical-transfer dual-ferrule adaptor shown in FIG. 11B;

FIG. 12A is a side view of one embodiment of a mechanical-transfer dual-ferrule connector unlatching from a mechanical-transfer dual-ferrule adaptor according to aspects of the present disclosure;

FIG. 12B is a cross-sectional top view of the mechanical-transfer dual-ferrule connector unlatching from the mechanical-transfer dual-ferrule adaptor shown in FIG. 12A; and FIG. 12C is an enlarged view of the mechanical-transfer dual-ferrule connector unlatching of the mechanical-transfer dual-ferrule adaptor shown in FIG. 12B.

DETAILED DESCRIPTION

Figure 1A:
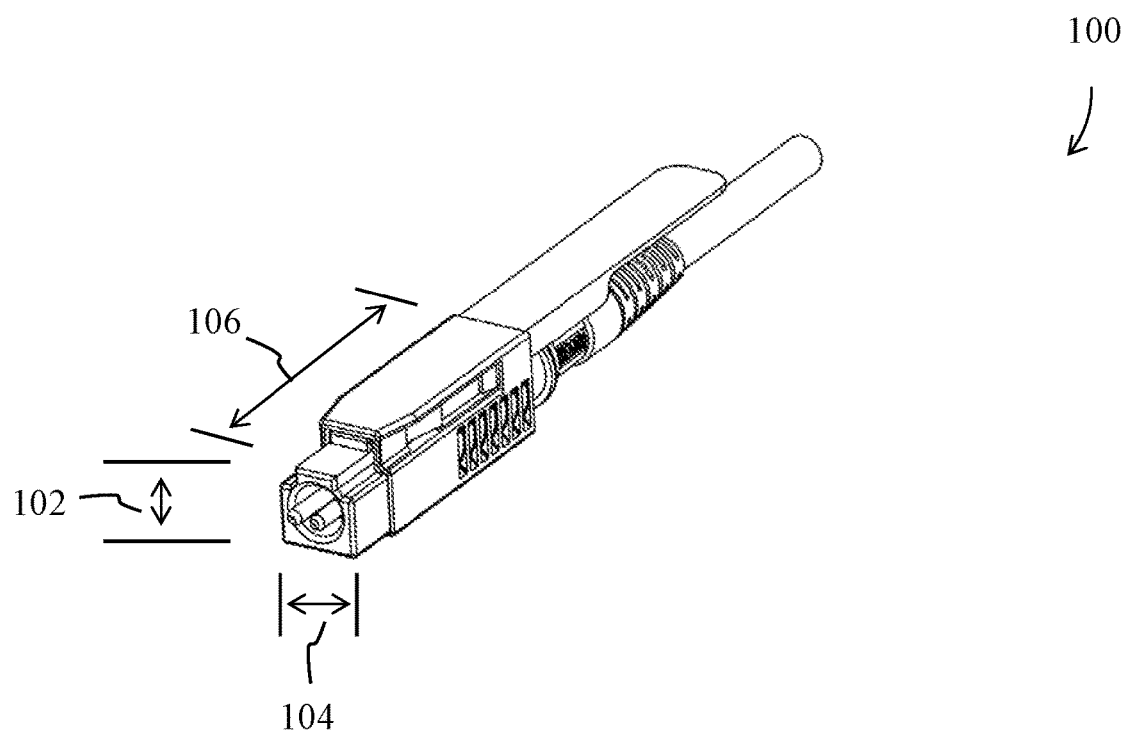
FIG. 1A is a perspective view of one embodiment of a mechanical-transfer dual-ferrule connector according to aspects of the present disclosure.

Certain exemplary embodiments will now be described to provide an overall understanding of the principles of the structure, function, and use of the devices and methods disclosed herein. One or more examples of these embodiments are illustrated in accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such embodiments and variations are intended to be included within the scope of the present invention.

So that the present invention may more readily be understand, certain terms are first defined.

As used herein, the terms "about" or "approximately" or "substantially" for any numerical values or ranges indicate a suitable dimensional tolerance that allows the part or collection of elements to function for its intended purpose as described herein. These terms indicate a ±10% variation about a central value.

The term "ferrule" is used herein consistent with its customary meaning in the art to refer to a device and/or components thereof that connect optical fibers.

The term "connector" is used herein consistent with its customary meaning in the art to refer to a device and/or components thereof that connect a first module or cable to a second module or cable. The connectors may be configured for fiber optic transmission or electrical signal transmission. The connector may be any suitable type now known or later developed such as, for example and without any limitation, a ferrule connector (FC), a fiber distributed data interface (FDDI) connector, a LC connector, a mechanical transfer (MT) connector, a mechanical transfer registered jack (MT-RJ) connector, a SC connector, a SC duplex connector, a straight tip (ST) connector, a multiple-fiber push-on (MPO) connector, or a media interface connector (MIC).

The term "adaptor" is used herein consistent with its customary meaning in the art to refer to a device and/or components thereof that couples a first module or cable or set of cables with a second module or cable or set of cables.

The term "cable" is used herein consistent with its customary meaning in the art to refer to an insulated wire or wires comprising a protective casing (e.g., a jacket, a sheathing material) and used for transmitting electricity or telecommunication signals. A "fiber optic cable" or an "optical cable" referred herein to a cable containing one or more optical fibers for conducting optical signals in beams of light. The optical fibers can be constructed from any suitable transparent material, including glass, fiberglass, and plastic. In addition, the cable can be connected to a connector on one end or on both ends of the cable, the cable can be coupled to an adaptor on one end or on both ends of the cable, and the cable can be connected to another cable on one end or on both ends of the cable.

The term "jumper" is used herein consistent with its customary meaning in the art to refer to a device and/or components thereof that connect multicore cables.

The term "panel" is used herein consistent with its customary meaning in the art to refer to a device and/or components thereof that connect incoming and outgoing lines of communication cables.

The terms "first", "second", "third", etc. are used herein to describe various elements and these elements are not limited by these terms. These terms are used to distinguish one element form another. Thus, for example, a first element that is discussed herein could be termed a second element without departing of the teachings of the exemplary embodiments.

The terms "above", "below", "above", "left," "right," "in front," "behind," and the like are used herein to describe the spatial relationship of one or more elements from one or more other elements. The spatially relative terms are intended to encompass different orientations of the element in use or operations in addition to the orientations described herein and depicted in the figures.

The present application relates generally to devices and methods for connecting optical fibers. For example and without any limitation, the various devices and methods of the invention can be utilized to optimize the connections between ports in high-density network panels by increasing the accessibility to the connectors by the operator and the number of connectors per transceiver, and by reducing the number of connector cables, the length of the connector cables, the number of connector cables that are dressed crossover to the equipment, and the dimension of the connectors. As discussed in more detail below, in some embodiments, optical fiber cables can be modularly coupled with one or more optical fiber connectors, adaptors, and other optical fiber cables using a remote release. Various aspects of the prior art and invention are described below.

Those familiar with the art will understand that the devices and methods described herein are more suitable at least for 2-fiber cable and high-density network panel applications than the devices and methods described in the prior art.

Various embodiments disclosed herein are configured for use as a mechanical-transfer connector, such as a mechanical-transfer dual-ferrule (MT-D2) connector 100 as shown in FIG. 1A. The mechanical-transfer dual-ferrule connector 100 has dimensions (e.g., height, width, length) smaller than most of other conventional connectors. For instance, the mechanical-transfer dual-ferrule connector 100 has a height 102 smaller than that of a conventional 12.7 mm high LC duplex connector or a conventional 9.3 mm high SC duplex connector. The mechanical-transfer dual-ferrule connector 100 has a width 104 smaller than that of conventional 12.4 mm wide MPO connector, a conventional 9.2 mm wide MT-RJ connector, a conventional 12.8 mm wide LC duplex connector, and/or a conventional 24.2 mm wide SC duplex connector. The mechanical-transfer dual-ferrule connector 100 has a length 106 smaller than that of a conventional 25.7 mm long MPO connector, a conventional 27.3 mm long LC duplex connector, or a conventional 25.2 mm long SC duplex connector.

In some embodiments, the mechanical-transfer connector is a mechanical-transfer dual-ferrule connector 100 having a height 102 in a range of about 6.5 mm to about 12.5 mm, such as a height of about 10.5 mm or a height of about 8.5 mm. In some embodiments, the mechanical-transfer connector is a mechanical-transfer dual-ferrule connector 100 having a width 104 in a range of about 5.0 mm to about 11.0 mm, such as a width of about 9.0 mm or a width of about 7.0 mm. In some embodiments, the mechanical-transfer connector is a mechanical-transfer dual-ferrule connector 100 having a length 106 in a range of about 19.2 mm to about 25.2 mm, such as a length of about 23.2 mm or a length of about 21.2 mm.

Figure 1B:
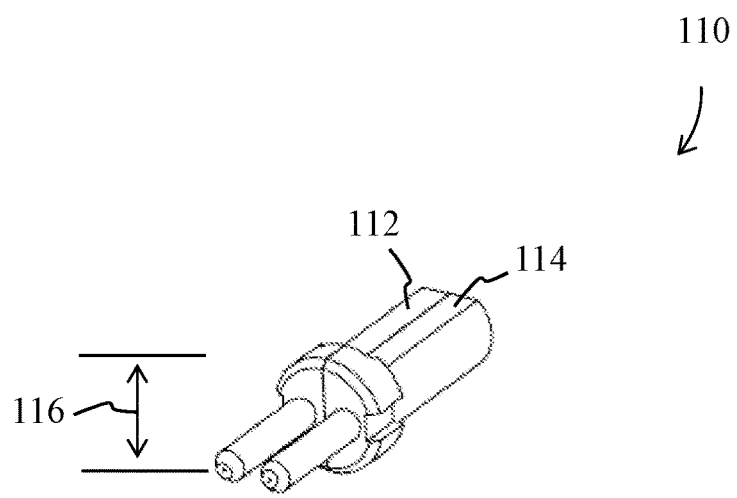
FIG. 1B is a perspective view of one embodiment of a mechanical-transfer dual-ferrule according to aspects of the present disclosure.

The mechanical-transfer dual-ferrule connector 100 comprises a male mechanical-transfer dual-ferrule 110 as shown in FIG. 1B or a female mechanical-transfer dual-ferrule (not shown). The male mechanical-transfer dual-ferrule 110 comprises two ferrules, a first ferrule 112 and a second ferrule 114, and the female mechanical-transfer dual-ferrule (not shown) also comprises two ferrules. In some embodiments, the ferrule is a one-fiber ferrule comprising one optical fiber. In some other embodiments, the ferrule is a multi-fiber ferrule comprising more than one optical fiber.

The male mechanical-transfer dual-ferrule 110 and the female mechanical-transfer dual-ferrule (not shown) have a frontal contact surface area smaller than that of conventional 2.5 mm high and 7.6 mm wide MPO ferrules, and conventional 2.5 mm high and 4.4 mm wide MT-RJ ferrules. In some embodiments, the mechanical-transfer dual-ferrule 110 has a contact surface diameter 116 in a range of about 1.0 mm to about 3.0 mm, such a diameter of about 2.0 mm or a diameter of about 1.2 mm.

Figure 1C:
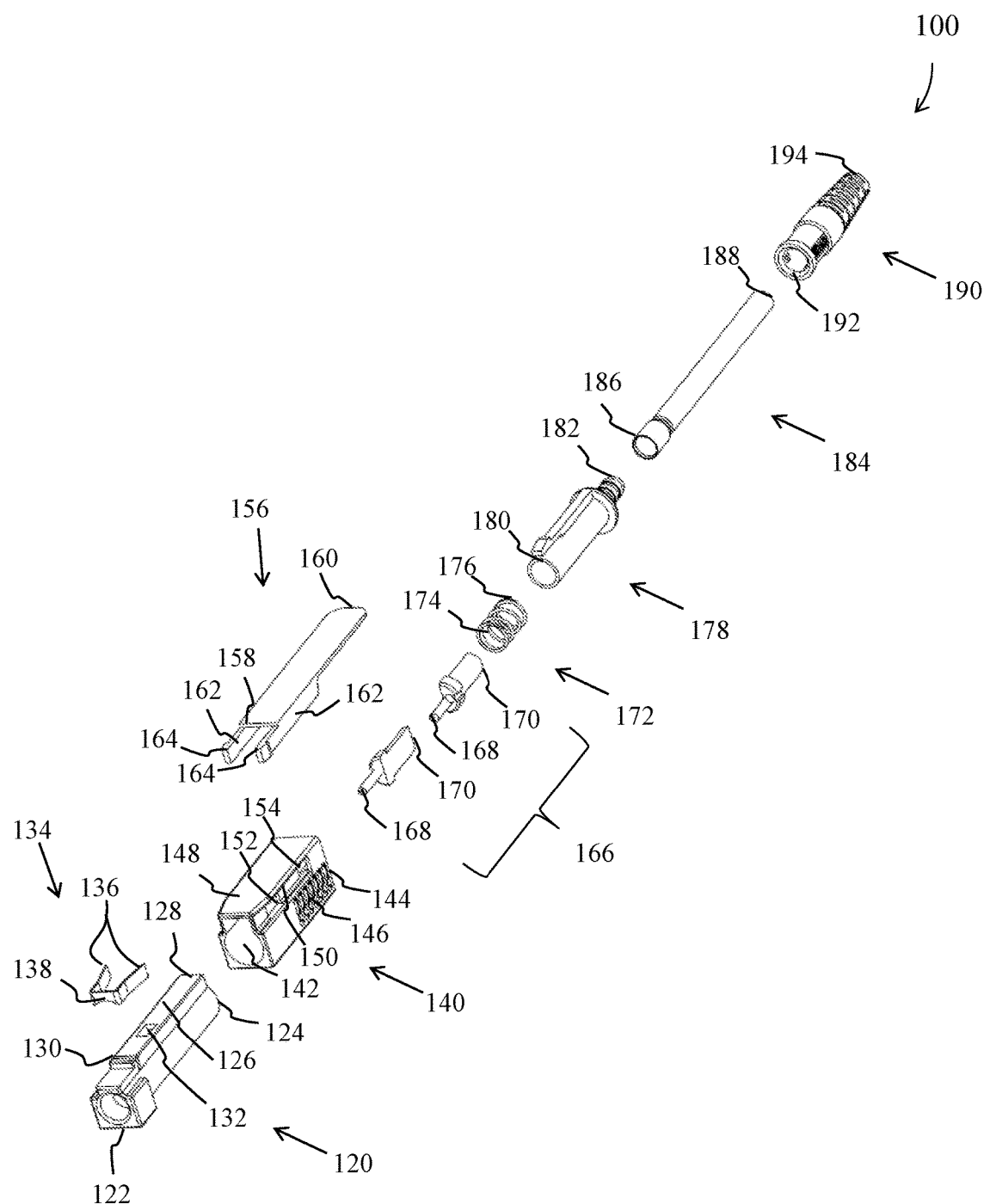
FIG. 1C is an exploded view of one embodiment of a mechanical-transfer dual-ferrule connector according to aspects of the present disclosure.

The connector disclosed herein is now described in more detail with reference to FIG. 1C. FIG. 1C shows an exploded view of the mechanical-transfer dual-ferrule connector 100 described herein. The connector 100 includes a plurality of functional elements that can be organized in a plurality of ways.

In some embodiments, as shown in FIG. 1C, the mechanical-transfer dual-ferrule connector 100 may include a housing 120 defining a longitudinal passage therethrough from a proximal end 122 to a distal end 124, wherein the proximal end 122 is spaced from the distal end 124. The housing 120 comprises a top elongated part 126 extending from a proximal end 130 to a distal end 128, wherein the proximal end 130 is spaced from the distal end 128 and the elongated part is an integral part of the housing. The top elongated part 126 comprises a latch hole 132, wherein the latch hole 132 is between the proximal end 130 and the distal end 128.

In some embodiments, as shown in FIG. 1C, the mechanical-transfer dual-ferrule connector 100 may include a latch spring 134 comprising at least two latch spring arms 136 connected by a latch spring connector 138. The latch spring connector 138 and the latch spring arms 136 are an integral part of the latch spring 134 and can be made of metal or other materials such as plastic and polymer. In the preferred embodiments, the latch spring arm 136 is metallic.

The latch spring 134 is coupled to the proximal end 130 of the top part 126 of the housing 120. The latch spring arms 136 are movably coupled with the housing 120. The latch spring 134 is configured to couple with a top part 126 of the housing 120.

In some embodiments, as shown in FIG. 1C, the mechanical-transfer dual-ferrule connector 100 may include a latch body 140 defining a longitudinal passage therethrough from a proximal end 142 to a distal end 144, wherein the proximal end 142 is spaced from the distal end 144. The latch body 140 comprises a first wall 146, a second wall 148, a third wall (not shown), and a fourth wall (not shown), wherein the first wall 146 and the third wall (not shown) are opposite to each other, and the second wall 148 and the fourth wall (not shown) are opposite to each other. In some embodiments, the first wall 146 comprises one groove 150 and two latch holes, a first latch hole 152 and a second latch hole 154, and the third wall (not shown) comprises one groove and two latch holes.

The latch body 140 is movably coupled with the housing 120 wherein at least part of the housing 120 is movable within the longitudinal passage of the latch body 140 and the proximal end 122 of the housing 120 protruding externally through the passage defined by the latch body 140. The person familiar with the art would appreciate the unique shape of the latch body 140 that allows it to couple with the housing 120.

The latch body 140 is movably coupled with the latch spring 134 wherein at least part of the latch spring is movable within the longitudinal passage of the latch body 140. The latch body 140 is configured to couple with the latch spring 134. In some embodiments, the latch spring arm 136 is at least partially within the first latch hole 152 of the latch body 140, and, in other embodiments, the latch spring arm 136 is not within the first latch hole 152 of the latch body 140.

In some embodiments, as shown in FIG. 1C, the mechanical-transfer dual-ferrule connector 100 may include a pull tab 156 having a proximal end 158 and a distal end 160, wherein the proximal end 158 is spaced from the distal end 160. The proximal end 158 comprises at least two latch arms 162, wherein each arm 162 protrudes forward from the proximal end 158 of the pull-tab 156 and comprises a latch hook 164.

The pull tab 156 is uniquely shaped so as to engage with the unique profile of the housing 120 and the latch body 140. At least part of the latch arms 162 of the pull tab 156 is within the longitudinal passage of the latch body 140. The latch hook 164 of the latch arm 162 is designed to couple with the second latch hole 154 so the pull-tab 156 can couple to the latch body 140. In some embodiments, the latch arm hook 164 is designed to snap with the second latch hole 154, and in other embodiments, the pull tab 156 is coupled to latch body 140 by means other than by snapping into position, such as sliding or hooking into position. In some embodiments, the pull-tab 156 is removably coupled to the latch body 140. In some embodiments, the pull tab 156 is an integral component of the latch body 140.

In some embodiments, as shown in FIG. 1C, the mechanical-transfer dual-ferrule connector 100 may include a mechanical-transfer dual-ferrule 166 extending longitudinally from a proximal end 168 to a distal end 170, wherein the proximal end 168 is spaced from the distal end 170. The mechanical-transfer dual-ferrule 166 is disposed at least partially within the longitudinal passage of the housing 120 with the proximal end 168 protruding externally through the passage defined by the housing 120.

In some embodiments, as shown in FIG. 1C, the mechanical-transfer dual-ferrule connector 100 may include a ferrule extension spring 172 defining a longitudinal passage therethrough from a proximal end 174 to a distal end 176, wherein the proximal end 174 is spaced from the distal end 176. The ferrule extension spring 172 is at least partially within the longitudinal passage of the housing 120, and the dual-ferrule 166 is at least partially within the longitudinal passage of the ferrule extension spring 172.

In some embodiments, as shown in FIG. 1C, the mechanical-transfer dual-ferrule connector 100 may include a back-post and spring retainer 178 defining a longitudinal passage therethrough from a proximal end 180 to a distal end 182, wherein the proximal end 180 is spaced from the distal end 182. The back-post and spring retainer 178 is at least partially within the longitudinal passage of the housing 120. The mechanical-transfer dual-ferrule 166 and the ferrule extension spring 172 are at least partially within the back-post and spring retainer 178.

In some embodiments, as shown in FIG. 1C, the mechanical-transfer dual-ferrule connector 100 may include an optical-cable crimp ring 184 defining a longitudinal passage therethrough from a proximal end 186 to a distal end 188, wherein the proximal end 186 is spaced from the distal end 188. The proximal end 186 of the optical-cable crimp ring 184 is coupled with the distal end 182 of the back-post and spring retainer 178, and the back-post and spring retainer 178 is at least partially within the optical-cable crimp ring longitudinal passage.

In some embodiments, as shown in FIG. 1C, the mechanical-transfer dual-ferrule connector 100 may include a strain relief boot 190 defining a longitudinal passage therethrough from a proximal end 192 to a distal end 194, wherein the proximal end 192 is spaced from the distal end 194. The cable boot 190 is coupled with the optical-cable crimp ring 184 and the optical-cable crimp ring 184 is at least partially within the strain relief boot 190.

The housing 120 and the mechanical-transfer dual-ferrule 166 are configured to be capable of coupling together, as shown in FIG. 2-6.

For instance, as shown in FIG. 2A, the housing 120 may comprise a positioning edge 121 and at least one alignment key 123. The positioning edge 121 positions the dual-ferrule 166 within the longitudinal passage of the housing 120 and the alignment key 123 aligns the dual-ferrule 166 within the longitudinal passage of the housing 120. The positioning edge 121, the alignment key 123 or both are an integral part of the housing 120, within the longitudinal passage of the housing 120, and at the proximal end 122 of the housing 120. FIG. 2B shows a side view of the housing 120 and the cross-section 125 of FIG. 2C. FIG. 2C shows a cross-sectional top view of the housing 120 comprising two alignment keys 123 that are integral to the housing wall 127.

In another instance, as shown in FIG. 3A, the mechanical transfer dual-ferrule 166 may comprise two ferrules 300, wherein the ferrules 300 comprise a flange 302 and an alignment pin 304. The flange 302 is defined by a proximal end 306 and a distal end 308, wherein the proximal end 306 is spaced from the distal end 308. The proximal end 306 of the flange 302 is designed to couple with the positioning edge 121 of the housing 120 and the distal end 308 of the flange 302 is designed to couple with the proximal end 174 of the ferrule extension spring 172. As shown in FIG. 3B, the ferrules 300 comprise at least one alignment notch 310 designed to align the ferrule flange 302 with the alignment key 123 of the housing 120. As shown in FIG. 3C, the ferrule flange 302 of the ferrules 300 may comprise a spring angle recess 312 and a surface 314 designed to couple with the ferrule extension spring 172. More specifically, the ferrule extension spring 172 is designed to push against the surface 314 to help to position the ferrules 300 within the housing 120. FIG. 3C also shows the cross-section 316 of FIG. 3D. As shown in FIG. 3D, a ferrule 300 contains a middle section 318 designed to host at least one optical fiber (not shown).

Figure 4A:
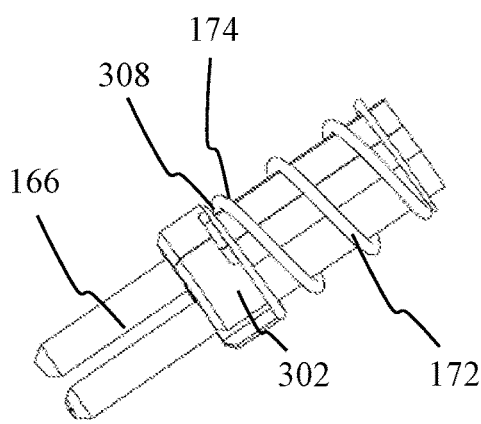
FIG. 4A is a perspective view of one embodiment of a mechanical-transfer dual-ferrule coupled with a ferrule extension spring according to aspects of the present disclosure.
Figure 4B:
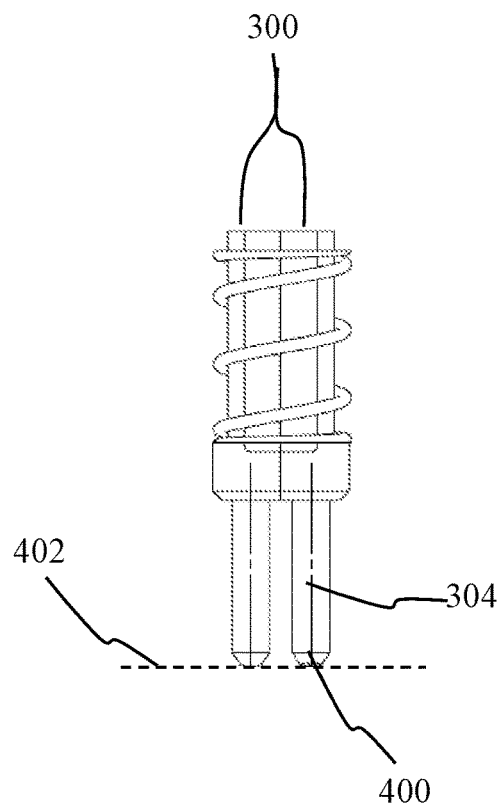
FIG. 4B is a top view of the mechanical-transfer dual-ferrule coupled with the ferrule extension spring shown in FIG. 4A.
Figure 4C:
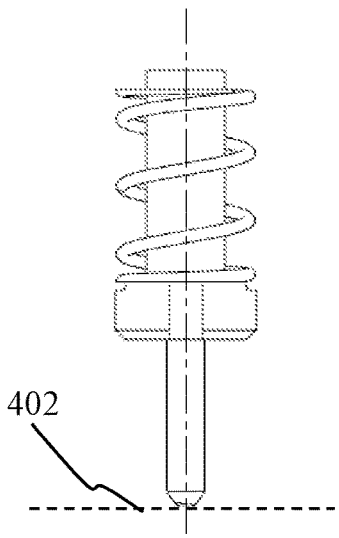
FIG. 4C is a side view of the mechanical-transfer dual-ferrule coupled with the ferrule extension spring shown in FIG. 4A.
Figure 5:
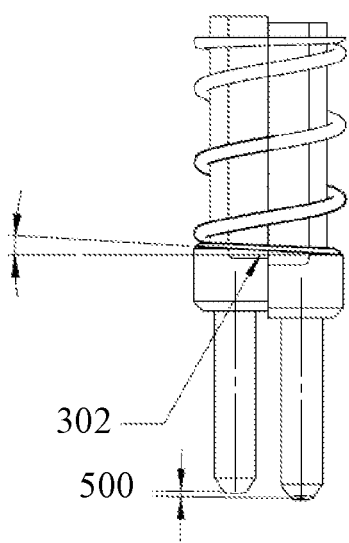
FIG. 5 is a top view of one embodiment of a mechanical-transfer dual-ferrule coupled with a ferrule extension spring according to aspects of the present disclosure.

In another instance, as shown in FIG. 4A, the dual-ferrule 166 is designed to couple with the ferrule extension spring 172. The dual-ferrule 166 is at least partially within the longitudinal passage of the ferrule extension spring 172. The distal end 308 of the flange 302 is in contact with the proximal end 174 of the ferrule extension spring 172. The tips 400 of the alignment pins 304 of the ferrules 300 can be evenly aligned 402 as shown in FIGS. 4B and 4C or unevenly aligned 500 as shown in FIG. 5. The mismatch in the alignment of the alignment pins 304 is due at least to the spring angle recess 302. Those familiar with the art would appreciate that an extension force can be supplied to both ferrules 300 even though there is a spring angle recess 312.

Figure 6A:
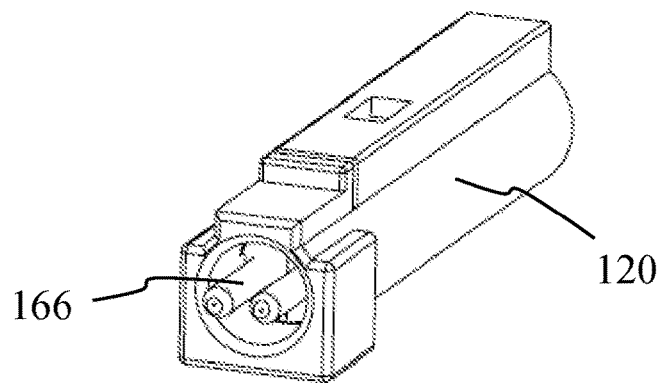
FIG. 6A is a perspective view of one embodiment of a housing coupled with a mechanical-transfer dual-ferrule and a ferrule extension spring according to aspects of the present disclosure.
Figure 6B:
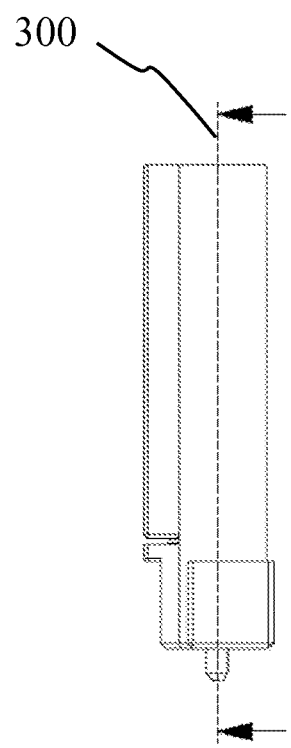
FIG. 6B is a side view of the housing coupled with the mechanical-transfer dual-ferrule and ferrule extension spring shown in FIG. 6A.
Figure 6C:
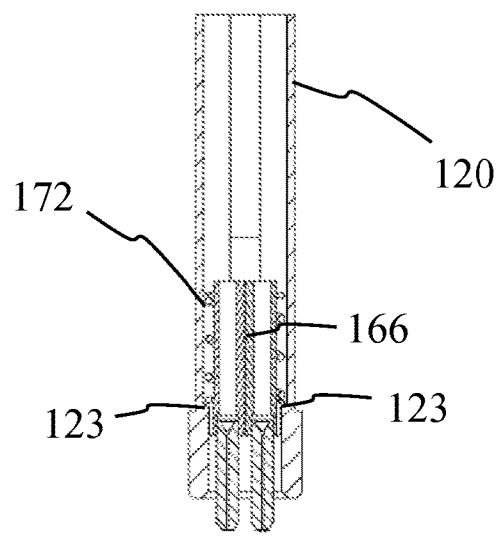
FIG. 6C is a cross-sectional top view of the housing coupled with the mechanical-transfer dual-ferrule and ferrule extension spring shown in FIG. 6A.

In another instance, as shown in FIG. 6A, the dual-ferrule 166 is designed to couple with the housing 120. The dual-ferrule 166 is at least partially within the longitudinal passage of the housing 120 and the proximal end of the dual-ferrule 166 is protruding externally to the passage of the housing 120 as shown in FIG. 6B. FIG. 6B shows a side view of the housing 120 coupled with the dual-ferrule 166 and the cross-section 600 of FIG. 6C. As shown in 6C, the dual-ferrule 166 is at least partially within the ferrule extension spring 172, partially within the longitudinal passage of the housing 120 and aligned by the alignment keys 123.

Figure 7:
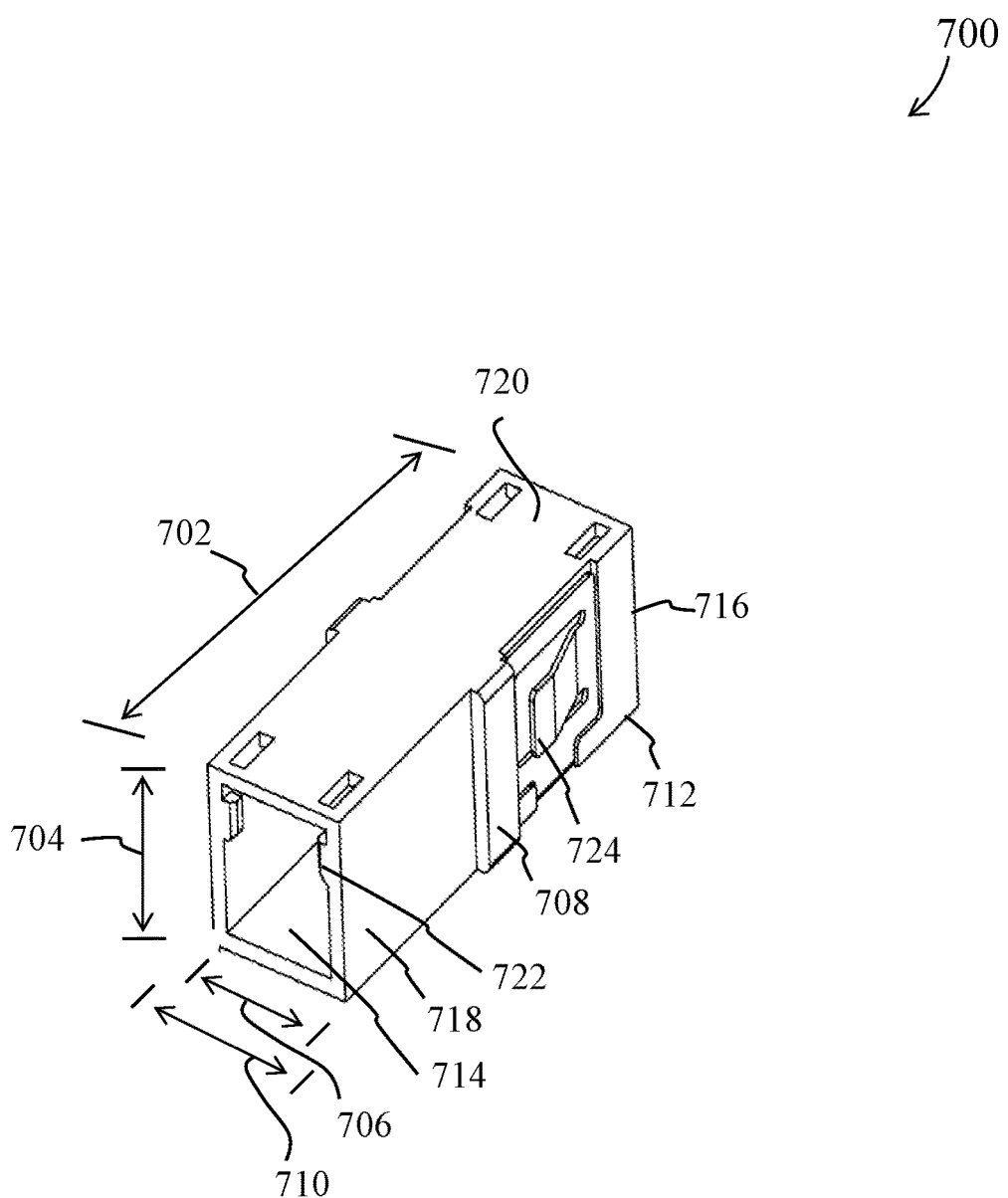
FIG. 7 is a perspective view of one embodiment of a mechanical-transfer dual-ferrule adaptor according to aspects of the present invention.

Various embodiments disclosed herein are configured for use as a mechanical-transfer adaptor, such as a mechanical-transfer dual-ferrule (MT-D2) adaptor 700 as shown in FIG. 7. FIG. 7 shows a perspective view of the adaptor 700.

In some embodiments, the mechanical-transfer dual-ferrule adaptor 700 has a length 702 in a range of about 27 mm to about 33 mm, such as a length of about 31 mm or a length of about 29 mm. In some embodiments, the mechanical-transfer dual-ferrule adaptor 700 has a height 704 in a range of about 9.0 mm to about 13.0 mm, such as a height of about 11.0 mm or a height of about 10.5 mm. In some embodiments, the mechanical-transfer dual-ferrule adaptor 700 has a width 706 in a range of about 8 mm to about 13 mm, such as a width of about 11 mm or a width of about 9 mm. In some embodiments, the mechanical-transfer dual-ferrule adaptor 700 has at least one mounting handle 708. In these embodiments, the mechanical-transfer dual-ferrule adaptor 700 has a width 710 in a range of about 10 mm to about 15 mm, such as a width of about 13 mm or a width of about 11 mm.

The mechanical-transfer dual-ferrule adaptor 700 includes a plurality of functional elements that can be organized in a plurality of ways. For instance, as shown in FIG. 7, the adaptor 700 may include a housing 712 defining a longitudinal passage therethrough from a proximal end 714 and a distal end 716, wherein the proximal end 714 is spaced from the distal end 716. The proximal end 714 and the distal end 716 are designed to couple with a male connector or a female connector. The housing 712 comprises a first wall 718, a second wall 720, a third wall (not shown), and a fourth wall (not shown), wherein the first wall 718 and the third wall (not shown) are opposed to each other, and the second wall 720 and the fourth wall (not shown) are opposed to each other. In some embodiments, the first wall 718 and the third wall (not shown) comprise at least one alignment and latching key 722 that is within the longitudinal passage of the housing 120 and an integral part of the housing 120. The alignment and latching key 722 is designed to align and latch the mechanical-transfer dual-ferrule connector 100 within the longitudinal passage of the mechanical-transfer dual-ferrule adaptor 700. In some embodiments, the housing 120 comprises at least one mounting handle 708 and one mounting flange 724 that are designed to couple with a network panel or other types of network equipment.

Figure 8A:
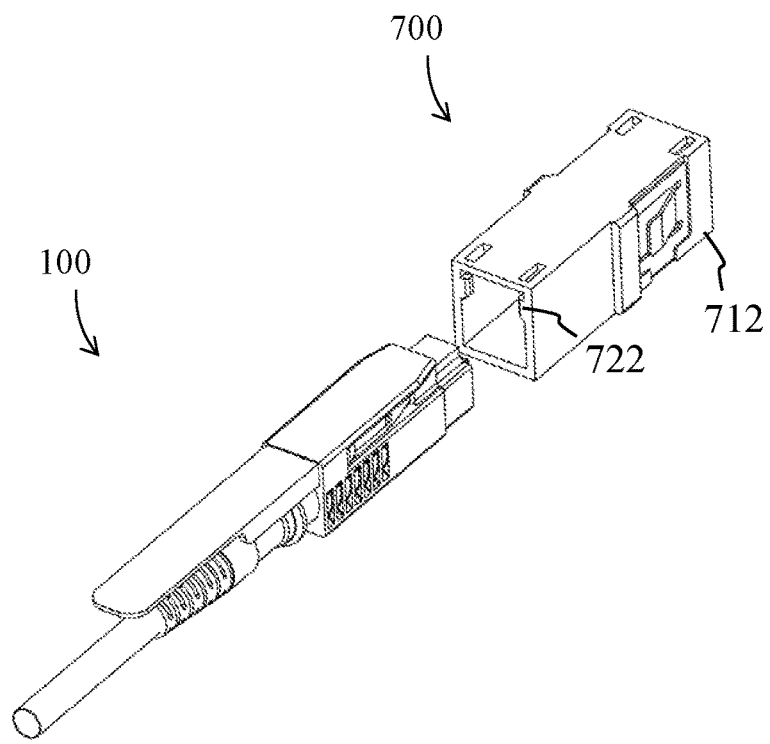
FIG. 8A is an exploded view of one embodiment of a mechanical-transfer dual-ferrule connector coupled to a mechanical-transfer dual-ferrule adaptor according to aspects of the present disclosure.
Figure 8B:
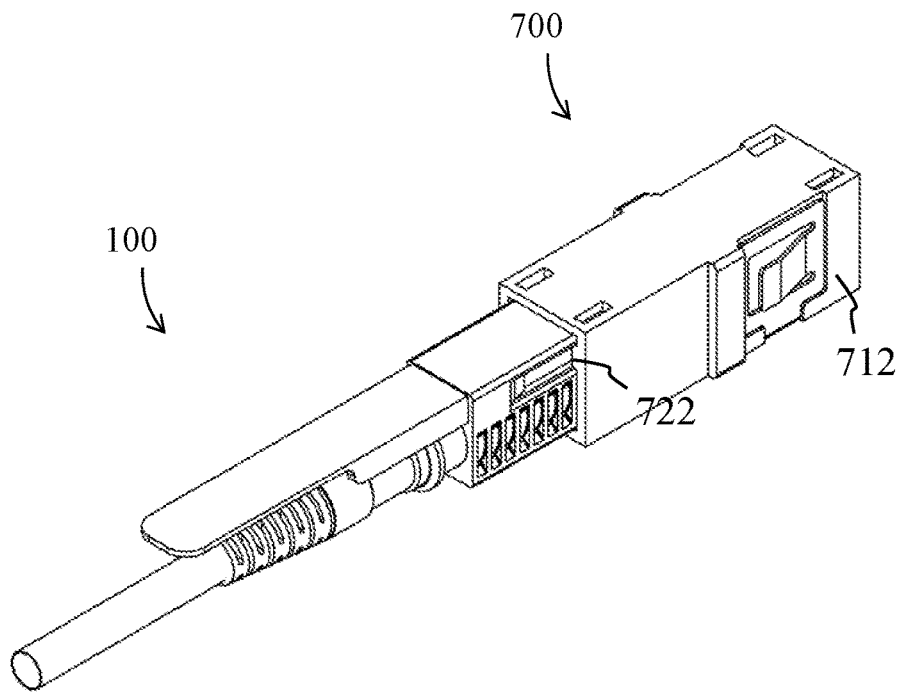
FIG. 8B is a perspective view of the mechanical-transfer dual-ferrule connector coupled to the mechanical-transfer dual-ferrule adaptor shown in FIG. 8A.

The mechanical-transfer dual-ferrule connector 100 is designed to couple with the mechanical-transfer dual-ferrule adaptor 700. The connector 100 can latch to the adaptor 700 using a number of mechanisms. People familiar with the art will recognize the advantage of the alignment and latching key 722 of the adaptor 700 to align and insert the connector 100 within the longitudinal passage of the adaptor housing 712 as shown in FIGS. 8A and 8B.

FIGS. 9A-9C show the mechanical-transfer dual-ferrule connector 100 during insertion into the mechanical-transfer dual-ferrule adaptor 700. More specifically, FIG. 9A shows a side view of the connector 100 coupled to the adaptor 700, and the cross-section 900 of FIG. 9B. FIG. 9B shows a cross-sectional view of the connector 100 coupled to the adaptor 700. FIG. 9C shows an enlarged section of the cross-section view of the connector 100 coupled to the adaptor 700 from FIG. 9B. The latch spring arm 136 of the connector 100 makes contact 902 with the alignment and latching key 722 of the mechanical-transfer dual-ferrule adaptor 100 during the insertion and then bend inward 904 as the connector is inserted into the adapter 700.

FIGS. 10A-10C show the mechanical-transfer dual-ferrule connector 100 coupled to the mechanical-transfer dual-ferrule adaptor 700 when the connector is pushed deeper into the adaptor. More specifically, FIG. 10A shows a side view of the connector 100 coupled to the adaptor 700 and the cross-section 1000 of FIG. 10B. FIG. 10B shows a cross-sectional view of the connector 100 coupled to the adaptor 700. FIG. 10C shows an enlarged section of the cross-section view of the connector 100 coupled to the adaptor 700 from FIG. 10B. The latch spring arm 136 of the connector 100 is bent inward 1002 as the connector is pushed deeper into the adaptor 100.

FIGS. 11A-11C show the mechanical-transfer dual-ferrule connector 100 coupled to the mechanical-transfer dual-ferrule adaptor 700 when the connector is latched into the adaptor. More specifically, FIG. 11A shows a side view of the connector 100 coupled to the adaptor 700 and the cross-section 1100 of FIG. 11B. FIG. 11B shows a cross-sectional view of the connector 100 coupled to the adaptor 700. FIG. 11C shows an enlarged section of the cross-section view of the connector 100 coupled to the adaptor 700 from FIG. 11B. The latch spring arm 136 of the connector 100 springs outward 1102 to securely latch the connector 100 inside the adapter 700.

FIGS. 12A-12C show the mechanical-transfer dual-ferrule connector 100 coupled to the mechanical-transfer dual-ferrule adaptor 700 when the connector 100 is unlatched from the adaptor 700. More specifically, FIG. 12A shows a side view of the connector 100 coupled to the adaptor 700 and the cross-section 1200 of FIG. 12B. The latch body 140 is pushed rearward 1202, using or not the pull tab 156, in order to unlatch the connector from the adaptor. FIG. 12B shows a cross-sectional view of the connector 100 coupled to the adaptor 700. FIG. 12C shows an enlarged section of the cross-section view of the connector 100 coupled to the adaptor 700 from FIG. 12B. The latch body 140 pushes the latch spring arms 136 inward 1204 and unlatches the connector 100 from the adaptor 700. Continued pulling back of the latch body 140 then removes the connector 100 from the adaptor 700.

What is claimed:

1. An optical fiber connector configured to be coupled with an adaptor, the connector comprising:
    a housing defining a longitudinal passage therethrough;
    a latch body defining a longitudinal passage therethrough and being movably coupled to the housing;
    at least one metallic latch spring disposed at least partially within the latch body and being coupled with the housing and the latch body;
    at least one ferrule extending longitudinally from a first end to a second end, wherein each ferrule is disposed at least partially within the longitudinal passage of the housing with the first end protruding external to the longitudinal passage of the housing, wherein the at least one ferrule comprises a spring angle recess; and
    a ferrule extension spring disposed in the longitudinal passage of the housing and coupled to the at least one ferrule.

2. The optical fiber connector of claim 1, wherein the connector is a dual-ferrule connector comprising two ferrules.

3. The optical fiber connector of claim 2, wherein an end face of the two ferrules has a surface diameter in a range of about 1.0 mm to about 3.0 mm.

4. The optical fiber connector of claim 1, wherein the connector has a width in a range of about 5.0 mm to about 9.0 mm.

5. The optical fiber connector of claim 1, wherein the connector has a height in a range of about 6.5 mm to about 10.5 mm.

6. The optical fiber connector of claim 1, wherein the connector has a length in a range of about 17.2 mm to about 25.2 mm.

7. The optical fiber connector of claim 1, wherein the at least one ferrule comprises a flange and an alignment notch.

8. The optical fiber connector of claim 1, wherein the housing comprises at least one alignment key designed to align the at least one ferrule.

9. The optical fiber connector of claim 1, wherein the latch body is coupled with a pull-tab.

10. The optical fiber connector of claim 9, wherein the pull-tab comprises a first end and a second end spaced from the first end, the first end comprises at least one pull-tab arm, and the second end is configured to actuate the connector.

11. The optical fiber connector of claim 10, wherein the pull-tab arm comprises a hook coupled with the latch body.

12. The optical fiber connector of claim 11, wherein the second end of the pull-tab is configured to actuate the latch body and the latch spring.

13. An optical fiber connector configured to be coupled with an adaptor, the connector comprising:
    a housing defining a longitudinal passage therethrough;
    a latch body defining a longitudinal passage therethrough and being movably coupled to the housing, wherein the latch body is coupled with a pull-tab, wherein the pull-tab comprises a first end and a second end spaced from the first end, the first end comprises at least one pull-tab arm, and the second end is configured to actuate the connector, wherein the pull-tab arm comprises a hook coupled with the latch body;
    at least one metallic latch spring disposed at least partially within the latch body and being coupled with the housing and the latch body;
    at least one ferrule extending longitudinally from a first end to a second end, wherein each ferrule is disposed at least partially within the longitudinal passage of the housing with the first end protruding external to the longitudinal passage of the housing; and a ferrule extension spring disposed in the longitudinal passage of the housing and coupled to the at least one ferrule.

14. The optical fiber connector of claim 13, wherein the connector is a dual-ferrule connector comprising two ferrules.

15. The optical fiber connector of claim 14, wherein an end face of the two ferrules has a surface diameter in a range of about 1.0 mm to about 3.0 mm.

16. The optical fiber connector of claim 13, wherein the at least one ferrule comprises a flange and an alignment notch.

17. The optical fiber connector of claim 13, wherein the housing comprises at least one alignment key designed to align the at least one ferrule.

18. The optical fiber connector of claim 13, wherein the second end of the pull-tab is further configured to actuate the latch body and the latch spring.

* * * * *